(12) United States Patent
Gulati et al.

(10) Patent No.: US 8,914,598 B2
(45) Date of Patent: Dec. 16, 2014

(54) DISTRIBUTED STORAGE RESOURCE SCHEDULER AND LOAD BALANCER

(75) Inventors: Ajay Gulati, Mountain View, CA (US);
Irfan Ahmad, Mountain View, CA (US);
Chethan Kumar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1429 days.

(21) Appl. No.: 12/566,435

(22) Filed: Sep. 24, 2009

(65) Prior Publication Data
US 2011/0072208 A1    Mar. 24, 2011

(51) Int. Cl.
G06F 12/00    (2006.01)
(52) U.S. Cl.
USPC ........ 711/165; 711/6; 711/114; 711/E12.103; 711/E12.002
(58) Field of Classification Search
None
See application file for complete search history.

(56) References Cited

U.S. PATENT DOCUMENTS

| | | | |
|---|---|---|---|
| 7,469,289 B2 | 12/2008 | Arakawa et al. | |
| 7,739,470 B1 | 6/2010 | Norgren | |
| 7,818,746 B2 | 10/2010 | Anderson | |
| 2005/0081010 A1 | 4/2005 | DeWitt et al. | |
| 2006/0236073 A1 | 10/2006 | Soules et al. | |
| 2007/0043860 A1* | 2/2007 | Pabari | 709/224 |
| 2009/0070771 A1 | 3/2009 | Yuyitung et al. | |
| 2009/0222560 A1* | 9/2009 | Gopisetty et al. | 709/226 |
| 2009/0228589 A1* | 9/2009 | Korupolu | 709/226 |
| 2009/0300283 A1 | 12/2009 | Kudo | |
| 2009/0313312 A1 | 12/2009 | Colbeck et al. | |
| 2010/0162003 A1 | 6/2010 | Dodgson et al. | |
| 2010/0332657 A1* | 12/2010 | Elyashev et al. | 709/226 |

OTHER PUBLICATIONS

"DVD Store," located at <http://www.delltechcenter.com/p./DVD+store>, visited on Jul. 19, 2010, 1 page.
"Iometer," located at <http://www.iometer.org>, visited on Jul. 19, 2010, 1 page.
"Useful IO Profiles for Simulating Various Workloads," located at <http://blogs.msdn.com/b/tvoellm/archive/2009/05/07/useful-io-profiles-for-simulating-various-workloads.aspx>, visited on Jul. 19, 2010, 1 page.
I. Ahmad. "Easy and Efficient Disk I/O Workload Characterization in VMware ESX Server," IISWC, Sep. 2007.
G. A. Alvarez and et al. "Minerva: An Automated Resource Provisioning Tool for Large-Scale Storage Systems," in ACM Transactions on Computer Systems, pp. 483-518, Nov. 2001.
E. Anderson. "Simple Table-Based Modeling of Storage Devices," in SSP Technical Report, HP Labs, Jul. 2001.
E. Anderson and et al. "Hippodrome: Running Circles Around Storage Administration," in Proc. of Conf. on File and Storage Technology (FAST'02), pp. 175-188, Jan. 2002.
A. Gulati, I. Ahmad, and C. Waldspurger. "PARDA: Proportionate Allocation of Resources for Distributed Storage Access," in USENIX FAST, Feb. 2009.

(Continued)

Primary Examiner — Matthew Bradley
Assistant Examiner — Arvind Talukdar

(57) ABSTRACT

Distributed storage resources are managed based on data collected from online monitoring of workloads on the storage resources and performance characteristics of the storage resources. Load metrics are calculated from the collected data and used to identify workloads that are migration candidates and storage units that are migration destinations, so that load balancing across the distributed storage resources can be achieved.

14 Claims, 4 Drawing Sheets

(56) References Cited

OTHER PUBLICATIONS

A. Gulati, C. Kumar, and I. Ahmad. "Storage Workload Characterization and Consolidation in Virtualized Environments," in Workshop on Virtualization Performance: Analysis, Characterization, and Tools (VPACT), 2009.

S. Kavalanekar, B. Worthington, Q. Zhang, and V. Sharda. "Characterization of Storage Workload Traces From Production Windows Servers," in IEEE IISWC, pp. 119-128, Sep. 2008.

A. Merchant and P.S. Yu. "Analytic Modeling of Clustered Raid with Mapping Based on Nearly Random Permutation," IEEE Trans. Comput., 45(3): p. 367-373, 1996.

M.P. Mesnier, M. Wachs, R. R. Sambasivan, A.X. Zheng, and G.R. Ganger. "Modeling the Relative Fitness of Storage," SIGMETRICS Perform. Eval. Rev., 35(1): p. 37-48, 2007.

B. Przydatek. "A Fast Approximation Algorithm for the Subset-Sum Problem," 1999.

C. Ruemmler and J. Wilkes. "An Introduction to Disk Drive Modeling," IEEE Computer, 27(3):17-28, 1994.

Y.-L. Shen and L. Xu. "An Dfficient Disk I/O Characteristics Collection Method Based on Virtual Machine Technology," 10th IEEE Intl. Conf. on High Performance Computing and Comm., 2008.

E. Shriver A. Merchant, and J. Wilkes. "An Analytic Behavior Model for Disk Drives with Readahead Caches and Request Reordering," SIGMETRICS Perform. Eval. Rev., 26(1): p. 182-191, 1998.

M. Uysal, G. A. Alvarez, and A. Merchant. "A Modular, Analytical Throughput Model for Modern Disk Arrays," in MASCOTS, 2001.

E. Varki, A. Merchant, J. Xu, and X. Qiu. "Issues and Challenges in the Performance Analysis of Real Disk Arrays," IEEE Trans. Parallel Distrib. Syst., 15(6): p. 559-574, 2004.

"VMware Infrastructure Resource Management with VMware DRS," 2006, located at <http://vmware.com/pdf/vmware_drs_wp.pdf>, visited on Jul. 19, 2010, 24 pages.

M. Wang, K. Au, A. Ailamaki, A. Brockwell, C. Faloutsos, and G. R. Ganger. "Storage Device Performance Prediction with Cart Models," in MASCOTS, 2004.

\* cited by examiner

DISTRIBUTED STORAGE RESOURCE SCHEDULER AND LOAD BALANCER

BACKGROUND

A distributed storage system employs multiple storage arrays and serves multiple client computers over a network. In such a system, loads on the storage arrays will vary as demands from the client computers fluctuate. To optimize performance of the storage arrays, loads on the multiple storage arrays are observed and balanced when they become uneven.

Various approaches have been developed to improve the performance of storage arrays. The focus of one approach is storage array reconfiguration. In this approach, the storage array is reconfigured to better serve the applications running on it. Another approach is storage array performance modeling, where the storage arrays are modeled in terms of their performance. The goal is to create a model, which accurately describes the performance of the storage arrays. Given such a model, various "what if" scenarios can be modeled prior to implementation. A third approach implements block level migrations. The idea here is carry out block level migrations within a storage array or across multiple storage arrays to improve performance.

In virtualized computer systems, in which disk images of virtual machines are stored in the storage arrays, disk images of virtual machines are migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. However, the usage so far has been mostly manual based on observations of loads on the storage arrays and there is a need for automating the task of identifying what to move and where.

SUMMARY

One or more embodiments of the present invention provide methods and computer program products for managing distributed storage resources based on online monitoring of workloads on the storage resources and performance characteristics of the storage resources.

A method of managing distributed storage resources including a first storage unit and a second storage unit, according to an embodiment of the present invention, comprises the steps of monitoring workloads associated with objects stored in the first storage unit and the second storage unit and a performance of the first storage unit and the second storage unit, while the first storage unit and the second storage unit are online, and identifying one or more of the objects to be migrated between the first storage unit and the second storage unit based on the workloads associated with the objects and the performance of the first storage unit and the second storage unit. An object whose workload is monitored may be a disk volume, a disk image of a virtual machine, or generally any logical group of files. A storage unit may be a logical storage unit, such as a logical unit number (LUN), a group of disks within a data array, or a physically distinct data array.

A computer program product, according to an embodiment of the present invention, comprises instructions which, when executed in a computing device for monitoring a first storage unit and a second storage unit, causes the computing device to carry out the steps of monitoring workloads associated with objects stored in the first storage unit and the second storage unit and a performance of the first storage unit and the second storage unit, while the first storage unit and the second storage unit are online, and identifying one or more of the objects to be migrated between the first storage unit and the second storage unit based on the workloads associated with the objects and the performance of the first storage unit and the second storage unit.

A method of performing load balancing across storage units having different vendor configurations based on online monitoring of workloads and input-output requests to the storage units, according to an embodiment of the invention, includes the steps of monitoring a workload associated with an object stored in a first storage unit, monitoring an online performance of the first storage unit, monitoring an online performance of a second storage unit, and migrating the object from the first storage unit to the second storage unit based on the workload associated with the object and the online performance of the first storage unit and the second storage unit.

DETAILED DESCRIPTION

Figure 1:
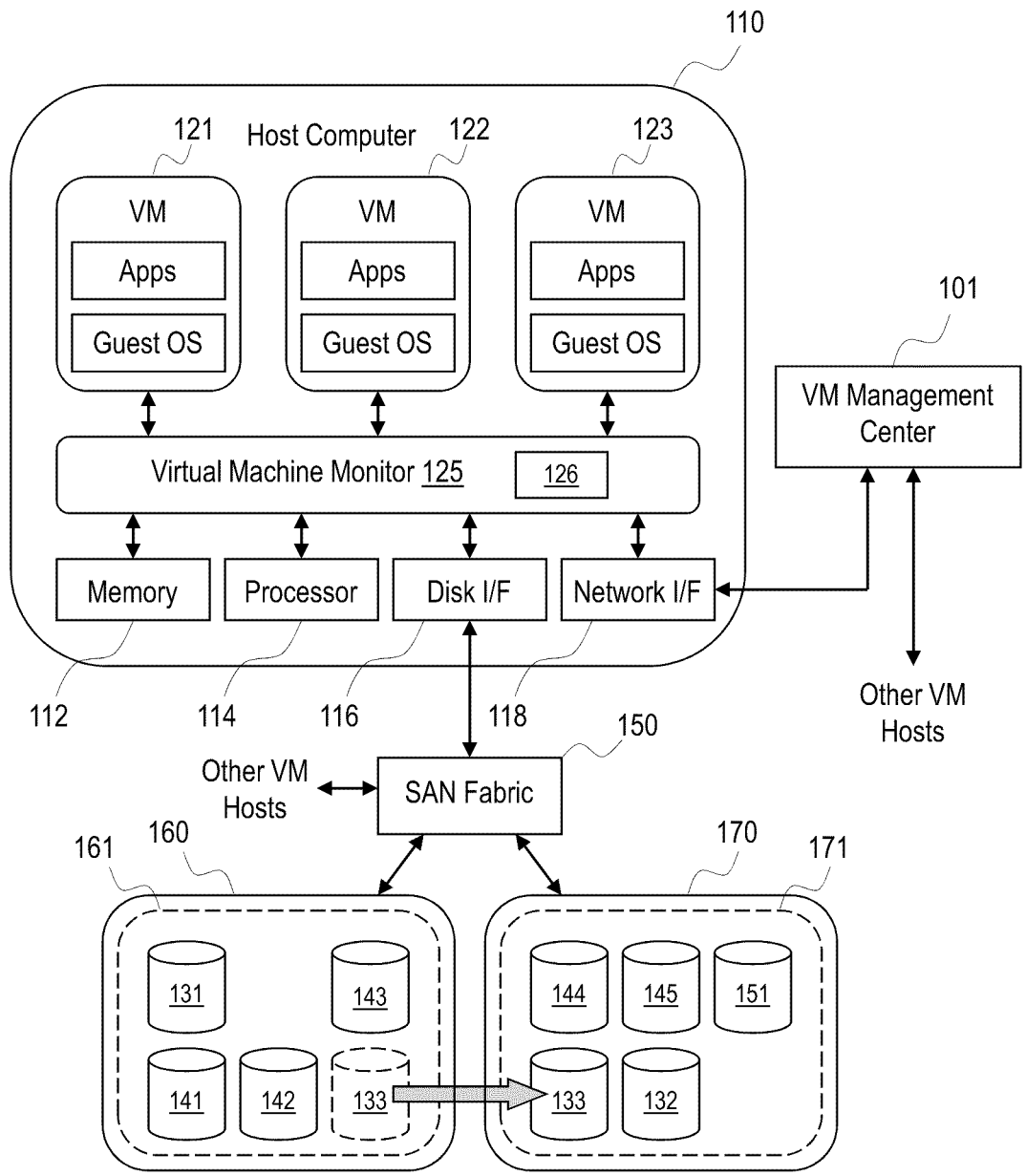
FIG. 1 depicts a block diagram of a virtualized computer system in which one or more embodiments of the present invention may be practiced.

FIG. 1 depicts a block diagram of a virtualized computer system in which one or more embodiments of the present invention may be practiced. The virtualized computer system includes a host computer 110 that has conventional components of a computing device, and may be implemented as a cluster of computing devices. Host computer 110 has configured therein one or more virtual machines, represented in FIG. 1 as VM 121, VM 122, and VM 123, that share hardware resources of host computer 110, such as system memory 112, processor 114, disk interface 116, and network interface 118. Examples of disk interface 116 are a host bus adapter and a network file system interface. An example of network interface 118 is a network adapter.

The virtual machines, VM 121, VM 122, and VM 123, run on top of a virtual machine monitor 150, which is a software interface layer that enables sharing of the hardware resources of host computer 110 by the virtual machines. Virtual machine monitor 150 may run on top of the host computer's operating system or directly on hardware components of the server platform. In some embodiments, virtual machine monitor 150 runs on top of a hypervisor that is installed on top of the hardware resources of host computer 110. Together, the virtual machines and virtual machine monitor 150 create virtualized computer systems that give the appearance of being distinct from host computer 110 and from each other. Each virtual machine includes a guest operating system and one or more guest applications. The guest operating system is a master control program of the virtual machine and, among other things, the guest operating system forms a software platform on top of which the guest applications run.

Data storage for host computer 110 is served by a storage area network (SAN), which includes a storage array 160 (e.g., a disk array), a storage array 170 (e.g., a disk array), and a switch 150 that connects host computer 110 to storage array 160 and storage array 170. Switch 150, illustrated in the embodiment of FIG. 1, is a SAN fabric switch, but other types of switches may be used. In addition, distributed storage systems other than SAN, e.g., network attached storage, may be used. As illustrated, switch 150 is further connected to virtual machine host computers, other than host computer 110, whose files are also stored in storage array 160 and storage array 170. Typically, storage array 160 and storage array 170 are exposed to the host computers as logical unit numbers (LUNs), and there is a mapping between the LUN and the physical devices, such as disk drives, in the storage arrays. In the embodiments disclosed herein, it is assumed that there is a one-to-one correspondence between the LUNs and the storage arrays, such that storage array 160 is LUN 161 and storage array 170 is LUN 171. However, the invention is applicable to storage array configurations where the correspondence between the LUNs and the storage arrays is not one-to-one.

In the embodiment illustrated in FIG. 1, LUN 161 includes disk images of four virtual machines and LUN 171 includes disk images of five virtual machines. VM 121 running in host computer 110 has a disk image 131 stored in LUN 161, and VM 122 running in host computer 110 has a disk image 132 stored in LUN 171. Disk image 133, which is the disk image corresponding to VM 123 running in host computer 110, is illustrated in dashed lines because it has been migrated to LUN 171. Disk images 141, 142, 143, 144, 145, 151 are disk images of virtual machines running in other virtual machine host computers. Disk images 141, 142, 143 are stored in LUN 161, and disk images 144, 145, 151 are stored in LUN 171.

A software component 126 is implemented inside virtual machine monitor 125 to monitor input-output operations (IOs) of the virtual machines. Alternatively, software component 126 may be implemented in the file system layer of the hypervisor. One example of software component 126 is the vscsiStats utility that is available from VMware Inc. Software component 126 generates, on a per virtual machine basis, histograms for the following parameters: (1) seek distance or randomness, which is a measure of the spatial locality in the workload measured as the minimum distance in terms of sectors or logical block numbers from among the last k number of IOs, a small distance signifying high locality; (2) IO data length, represented in different bins of size 512 Bytes, 1 KB, 2 KB, etc.; (3) outstanding IOs, denoting the queue length that virtual machine monitor 125 sees from a virtual machine; (4) IO rate; (5) IO latency, which is measured for each IO from the time it gets issued by the virtual machine until the virtual machine is interrupted for its completion; and (6) read/write ratio, which is a measure of number of read requests in relation to write requests.

Figure 2:
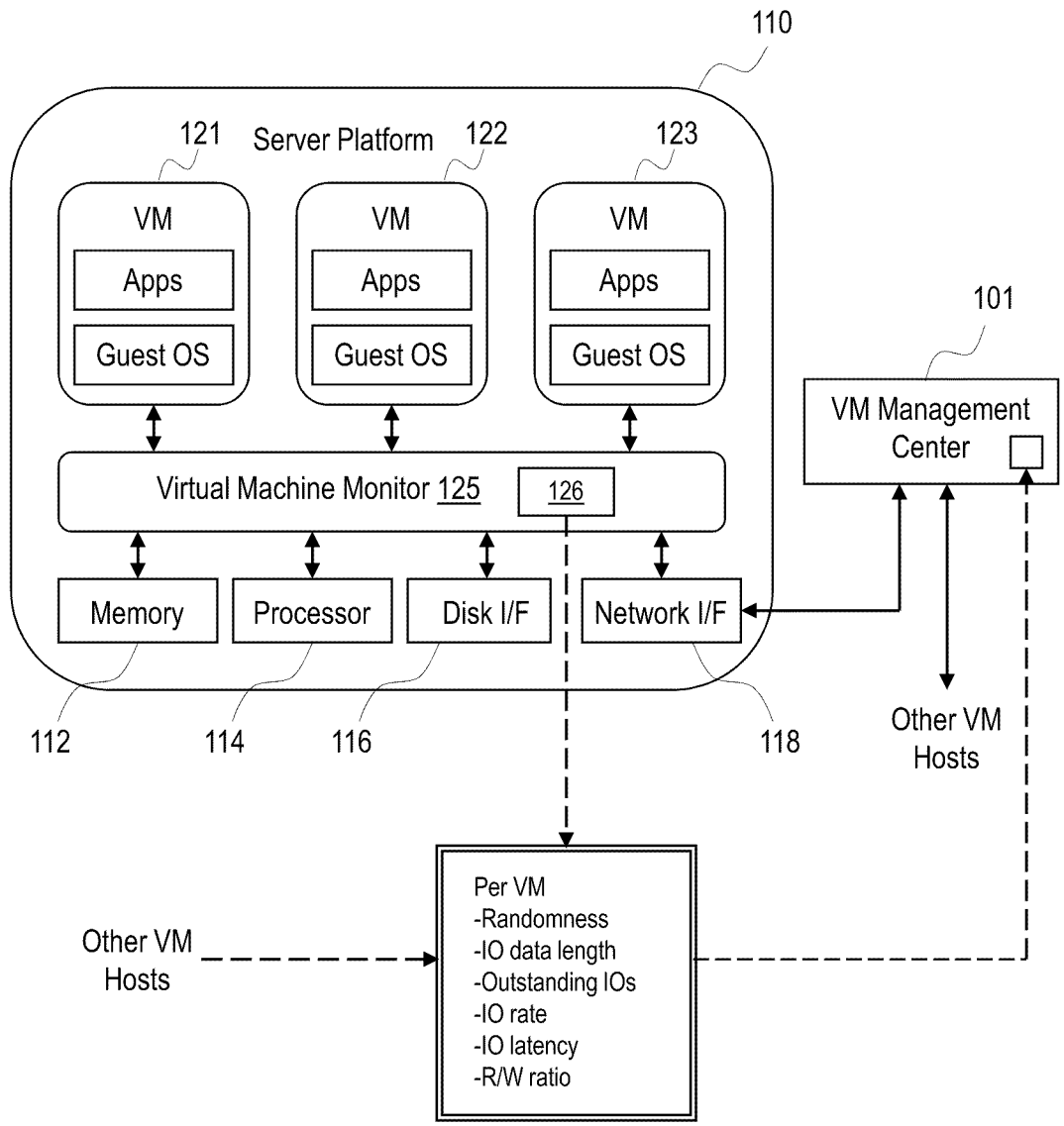
FIG. 2 shows the data collected by a component of the virtual machine monitor implemented in the virtualized computer system of FIG. 1.
Figure 3:
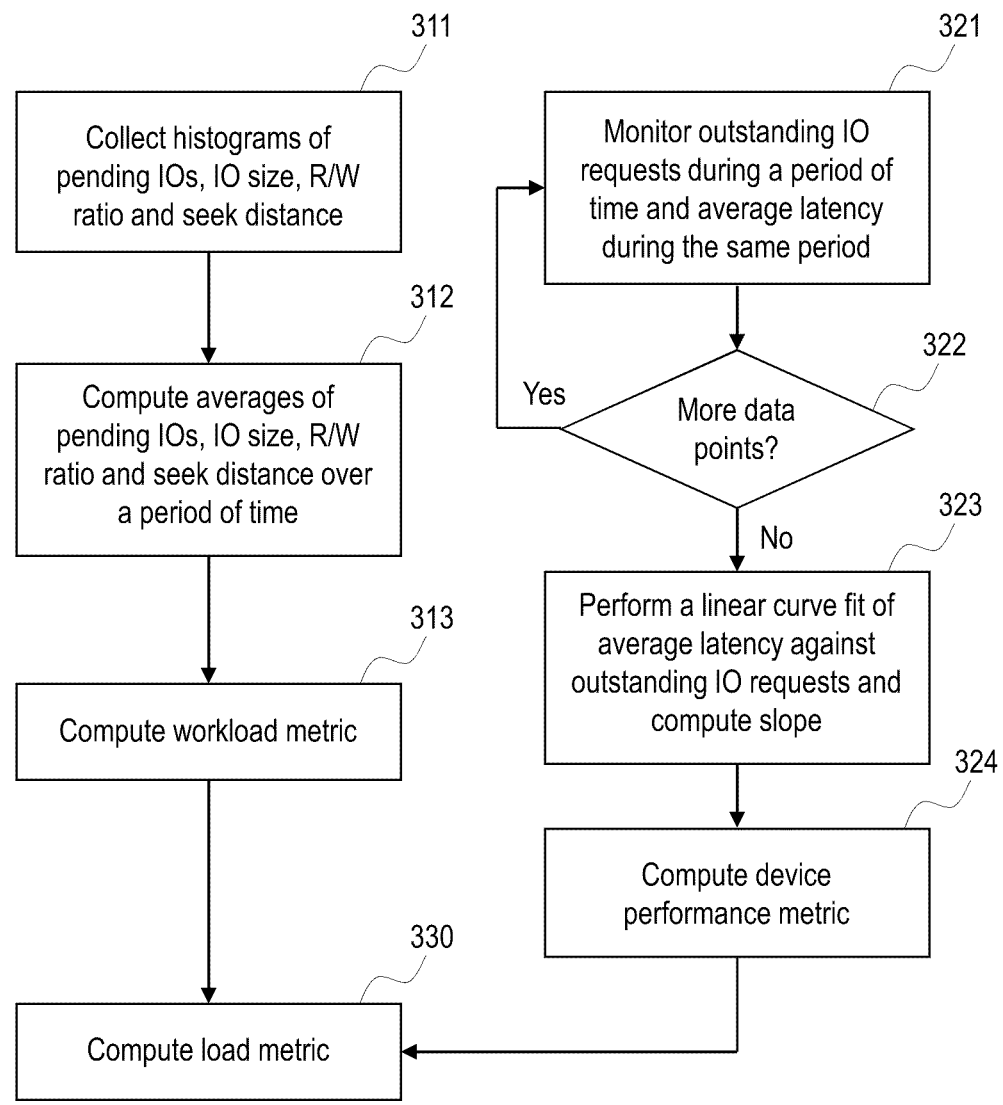
FIG. 3 is a flow diagram of a method for computing a normalized load metric, according to one or more embodiments of the present invention.
Figure 4:
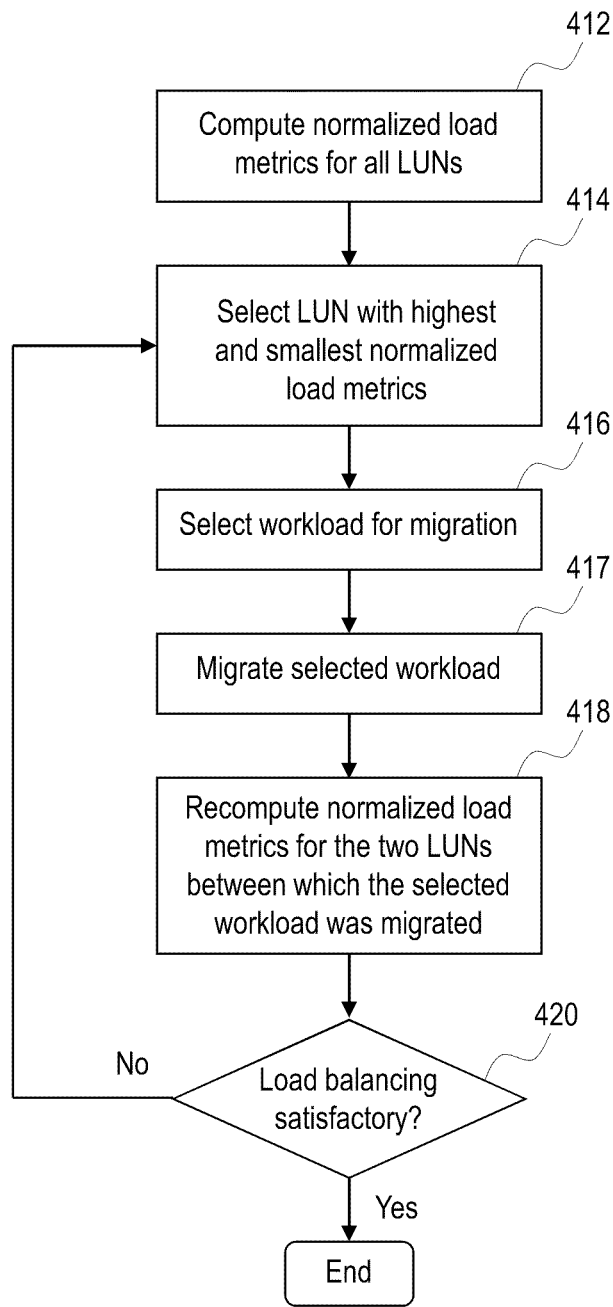
FIG. 4 is a flow diagram of a method for load balancing, according to one or more embodiments of the present invention.

FIG. 2 shows the data collected by software component 126. The collected data is used by processes running in a virtual machine management center 101 to carry out the methods illustrated in FIGS. 3 and 4. FIG. 3 is a flow diagram of a method for computing a load metric, according to one or more embodiments of the present invention. FIG. 4 is a flow diagram of a method for load balancing, according to one or more embodiments of the present invention.

The processes running in virtual machine management center 101 that carry out the methods illustrated in FIGS. 3 and 4 rely on an analysis model that provides a measure of a workload, W, in relation to a performance metric, P, of the LUN that has been assigned to handle the workload. This measure is referred to herein as the "load metric" and is modeled as W/P. This load metric varies over time, as IO requests associated with the workload being modeled and the loads on the LUN assigned to the workload being modeled change over time. In alternative embodiments, the performance metric, P, may be monitored at a RAID (Redundant Array of Independent Disks) group level. This can be done either by aggregating the statistics for all LUNs created per RAID group or by using some special interface provided by the storage array vendor.

The workload is modeled using the following equation for IO latency, L, where OIO is the number of outstanding IOs, IOsize is the average size of IOs, read % is the percentage of read requests in the IOs, and random % represents the spatial locality of the workload.

$$L = \frac{(K_1 + OIO)(K_2 + IOsize)}{\left(K_3 + \frac{\text{read \%}}{100}\right)\left(K_4 + \frac{\text{random \%}}{100}\right)} \cdot \frac{1}{K_5} \quad \text{[Eqn. 1]}$$

The numerator of Eqn. 1 represents the workload metric, W. Variations of this equation, which should be evident to those skilled in the art, may be used in other embodiments of the invention. In Eqn. 1, a high random % value correlates to the workload being highly random. A low random % value correlates to the workload being highly sequential. In one embodiment, the random % is derived as 100×(sum of all IOs that are greater than 2-3 MB away in the logical space)/(all IOs). It is also possible to assign randomness weight values in such a manner that IOs that are farther way receive higher weight values. One way to compute the random % without histograms is to keep a runlength parameter, where runlength is incremented if the next IO is very close to the previous one; otherwise it is reset. In such a case, the random %=100/runlength.

As a first step, IOs to the workload are varied over a period in such a manner that OIO, IOsize, read %, and random % of varying sizes are collected by software component 126. For each set of <OIO, IOsize, read %, random %>, the IO latency is also collected by software component 126. The constants, $K_1, K_2, K_3$, and $K_4$, are computed on the basis of the collected data in the following manner.

To compute $K_1$, two IO latency values, $L_1$ and $L_2$, with different OIO values and the same value for the other three parameters are used.

$$K_1 = \frac{OIO_1 - OIO_2 * L_1/L_2}{L_1/L_2 - 1} \quad \text{[Eqn. 2]}$$

This is repeated for all pairs of IO latency values where the OIO values differ while the other three variables remain the same. A number of $K_1$ values are obtained in this manner and the median of the different $K_1$ values is selected. Selecting a median ensures that the $K_1$ value is not biased by few extreme values. This procedure is repeated to compute each of $K_2, K_3$, and $K_4$. In one embodiment, K1 to K4 are computed empirically and then used as fixed values in the algorithm. Once these values are computed and fixed in the algorithm, online monitoring is performed to obtain workload specific parameters, such as OIO, IO size, read % and random %.

The performance metric of LUNs is dependent on device level characteristics, such as number of physical disks backing the LUN, rotational speed of the disk drives, average seek delay, etc., which are device-level information generally unknown to the host computers. Storage arrays are exposed to the host computers as a LUN and generally do not expose an application programming interface that allows the host computer to query the LUN regarding device level information. This complicates any load balancing decisions because an administrator who is contemplating a virtual disk migration from one storage array to another needs to know if the move is to a LUN that is backed with 20 disks or to a LUN that is backed with 5 disks.

For modeling the performance of LUNs, the IO latency is used as the main performance metric. For each LUN, data pairs consisting of number of outstanding IOs (OIOs) and average IO latency observed are collected for a number of time intervals. This information can be gathered with little overhead because the host computer knows the average number of outstanding IOs that are sent to a LUN and it already measures the average IO latency experienced by the IOs. As previously described, this information is collected by software component 126.

It is well understood that IO latency increases more or less linearly with the increase in number of outstanding IOs. Given this knowledge, the set of data points <OIO, IO latency> is collected online over a period of time and a linear fit line which minimizes the least squares error for the data points is computed. The parameter P is taken as the inverse of the slope of the linear fit line, such that higher P generally correlates to higher performance. The parameter P is computed in this manner for each LUN. In cases where device level information is available, the modeling can be performed on a per storage array basis, so that the parameter P is computed above for each storage array. Other ways of modeling the parameter P are possible. For example, in one embodiment, read OIOs and read latencies are used instead of overall OIOs and overall latency. In another embodiment, data points associated with large IO sizes (e.g., greater than 64 KB) and/or high sequentiality (i.e., low randomness, e.g., random % less than 10%) are ignored. The goal with each variation discussed above is to make the device model as independent of the workload as possible.

For load balancing, workloads of virtual machines are grouped based on the location of their disk images (i.e., LUN in which the disk images are stored) and a normalized load metric is computed for each LUN (i.e., the sum of workload metrics, W, for all workloads associated with the LUN divided by the parameter P for the LUN). For example, in the embodiment illustrated in FIG. 1, the normalized load metric for LUN 161 is the sum of workload metrics for workloads associated with disk images 131, 141, 142, 143 divided by the parameter P for LUN 161, and the normalized load metric for LUN 171 is the sum of workload metrics for workloads associated with disk images 132, 133, 144, 145, 151 divided by the parameter P for LUN 171. Heuristics are then employed to find migration candidates and migration destinations that will balance the workloads across the LUNs. A number of different heuristics known in the art can be used to perform this balancing. In one embodiment, the LUNs with the highest and lowest normalized load metrics are identified. Then, a virtual machine disk image in the LUN with the highest normalized load metric is migrated to the LUN with the lowest normalized load metric. This process is repeated until there is good balance across the LUNs.

In alternative embodiments, the search for the migration candidates can be biased in several ways. In one embodiment, disk images of virtual machines that have the smallest size/L are selected first, so the amount of data migrated can be minimized while maintaining the same effect on load balancing. In another embodiment, disk images of virtual machines that have the smallest current IO rate are selected first, so that the impact of migration now is minimal.

Recommendations for migrating disk images of virtual machines can be presented to the user as suggestions or can be carried out automatically during periods of low activity. In addition, recommendations on initial placement of disk images of virtual machines in LUNs can be made. For example, LUNs with relatively small normalized load metrics may be selected candidates for initial placement of disk images of new virtual machines.

In a further refinement, workloads are divided into three groups: sequential, local (somewhat sequential) and random. Experiments have confirmed that random workloads interfere destructively with sequential ones. Since the objective of the model described above is for virtual machine disk image placement, the performance loss from this effect can be minimized by careful workload segregation. Thus, as part of the load balancing step, affinity and anti-affinity hints can be incorporated by running multiple rounds of the model described above, one each for the segregated set of storage unit. For example, the model is run for all the storage units hosting sequential workloads and load balancing is performed amongst these storage units. The model is then run again for the second group of storage units hosting somewhat sequential workloads and load balancing is performed amongst these storage units. The model is then run again for the third group of storage units hosting random workloads and load balancing is performed amongst these storage units. In addition, sequential workloads are identified and placed on isolated devices as much as possible. In an alternative embodiment, workloads can be divided into two groups, sequential and random, so that the user can create separate LUNs for the sequential workloads or find better placement for the sequential workloads.

FIG. 3 is a flow diagram of a method for computing a normalized load metric, according to one or more embodiments of the present invention. For each virtual machine, the relevant workload parameters are monitored by collecting histograms of pending IOs, IO size, read/write ratio, and seek distance (Step 311). From the histograms, the average number of pending IOs, the average IO size, the percentage of reads in the IOs, and the randomness percentage are calculated (Step 312). In Step 313, the workload metric, W, is computed for each of the workloads being monitored. For each storage unit being monitored, the number of outstanding IO requests and the average IO latency are monitored over a period of time (Step 321). Step 321 is repeated as needed for different periods of time. When a sufficient number of data points for a linear fit have been collected (Step 322), the linear fit is carried out and the slope of the linear fit line is computed (Step 323). In Step 324, the performance metric, P, for the storage unit is computed as 1/(slope of the linear fit line). In step 330, the normalized load metric for each LUN is computed. The normalized load metric for a LUN is equal to the sum of the workload metrics for all workloads associated with the LUN, as obtained from Step 313, divided by the performance metric for the LUN, as obtained from Step 324.

FIG. 4 is a flow diagram of a method for load balancing, according to one or more embodiments of the present invention. In Step 412, the normalized load metrics for all LUNs are calculated in accordance with the method of FIG. 3. In Step 414, the LUNs with the highest and smallest normalized load metrics are selected. In Step 416, a workload from the LUN with the highest normalized load metric is selected for migration to the LUN with the lowest normalized load metric.

This selection can be done using any heuristic known in the art. In one embodiment, the workload with the highest workload metric is selected for migration. The selected workload is migrated to the LUN with the lowest normalized load metric in Step 417. The migration may be carried out, for example, using the Storage VMotion™ product that is available from VMware Inc. of Palo Alto, Calif. In Step 418, the normalized load metrics for the two LUNs between which the selected workload was migrated are recomputed. If the load balancing is satisfactory (Step 420), the process ends. If not, Steps 414-420 are repeated.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing distributed storage resources including a first storage unit and a second storage unit, comprising:

while the first storage unit and the second storage unit are online, monitoring workloads on the first storage unit and the second storage unit, the workloads being associated with objects stored in the first storage unit and the second storage unit, and monitoring performance of the first storage unit and the second storage unit, wherein the performance of the first storage unit is dependent on the number of outstanding input-output requests to the first storage unit and average latency of input-output requests to the first storage unit, and wherein the performance of the second storage unit is dependent on the number of outstanding input-output requests to the second storage unit and average latency of input-output requests to the second storage unit;

calculating a load metric for each of the first and second storage units based on measurements of the monitored workloads on the respective storage unit and a measurement of the monitored performance of the respective storage unit;

selecting an object to be migrated between the first storage unit and the second storage unit, wherein the object to be migrated is selected from the storage unit with the higher calculated load metric and comprises a disk image of a virtual machine; and migrating the disk image of the virtual machine between the first storage unit and the second storage unit without substantially interrupting the virtual machine.

2. The method according to claim 1, wherein a workload associated with an object is proportional to the number of outstanding input-output requests to the object and an average size of the input-output requests to the object.

3. The method according to claim 2, wherein the workload associated with the object is further proportional to the percentage of reads in the input-output requests to the object and a value representative of the randomness of the input-output requests to the object.

4. The method according to claim 1, wherein the first storage unit is a first logical unit number exposed by a first storage array and the second storage unit is a second logical unit number exposed by a second storage array.

5. The method according to claim 4, wherein the first storage array and the second storage array are physically separate storage arrays.

6. A non-transitory computer readable storage medium comprising instructions which, when executed in a computing device for monitoring a first storage unit and a second storage unit, causes the computing device to carry out the steps of:
 while the first storage unit and the second storage unit are online, monitoring workloads on the first storage unit and the second storage unit, the workloads being associated with objects stored in the first storage unit and the second storage unit, and monitoring performance of the first storage unit and the second storage unit, wherein the performance of the first storage unit is dependent on the number of outstanding input-output requests to the first storage unit and average latency of input-output requests to the first storage unit, and wherein the performance of the second storage unit is dependent on the number of outstanding input-output requests to the second storage unit and average latency of input-output requests to the second storage unit;
 calculating a load metric for each of the first and second storage units based on measurements of the monitored workloads on the respective storage unit and a measurement of the monitored performance of the respective storage unit;
 selecting an object to be migrated between the first storage unit and the second storage unit, wherein the object to be migrated is selected from the storage unit with the higher calculated load metric and comprises a disk image of a virtual machine; and
 migrating the disk image of the virtual machine between the first storage unit and the second storage unit without substantially interrupting the virtual machine.

7. The non-transitory computer readable storage medium according to claim 6, wherein a workload associated with an object is proportional to the number of outstanding input-output requests to the object and an average size of the input-output requests to the object.

8. The non-transitory computer readable storage medium according to claim 7, wherein the workload associated with the object is further proportional to the percentage of reads in the input-output requests to the object and a value representative of the randomness of the input-output requests to the object.

9. A method of performing load balancing across storage units having different vendor configurations based on online monitoring of workloads and input-output requests to the storage units, comprising:
 monitoring workloads on a first storage unit and on a second storage unit, each workload being associated with an object stored in the first or the second storage unit;
 monitoring an online performance of the first storage unit, wherein the online performance of the first storage unit is dependent on the number of outstanding input-output requests to the first storage unit and average latency of input-output requests to the first storage unit;
 monitoring an online performance of a second storage unit, wherein the online performance of the second storage unit is dependent on the number of outstanding input-output requests to the second storage unit and average latency of input-output requests to the second storage unit;
 calculating a load metric for each of the first and second storage units based on measurements of the monitored workloads on the respective storage unit and a measurement of the monitored performance of the respective storage unit;
 selecting an object for migration from the storage unit with the higher calculated load metric, wherein the selected object comprises a disk image of a virtual machine; and
 migrating the disk image between the first storage unit and the second storage unit without substantially interrupting the virtual machine.

10. The method according to claim 9, wherein a workload associated with an object is proportional to the number of outstanding input-output requests to the object and an average size of the input-output requests to the object.

11. The method according to claim 10, wherein the workload associated with the object is further proportional to the percentage of reads in the input-output requests to the object and a value representative of the randomness of the input-output requests.

12. The method according to claim 1, wherein the measurement of the monitored performance of the first storage unit is determined based on a linear fit which minimizes an error for a set of data points comprising the number of outstanding input-output requests to the first storage unit and the average latency of input-output requests to the first storage unit over respective time intervals, and wherein the measurement of the monitored performance of the second storage unit is determined based on a linear fit which minimizes an error for a set of data points comprising the number of outstanding input-output requests to the second storage unit and the average latency of input-output requests to the second storage unit over respective time intervals.

13. The non-transitory computer readable storage medium according to claim 6, wherein the measurement of the monitored performance of the first storage unit is determined based on a linear fit which minimizes an error for a set of data points comprising the number of outstanding input-output requests to the first storage unit and the average latency of input-output requests to the first storage unit over respective time intervals, and wherein the measurement of the monitored performance of the second storage unit is determined based on a linear fit which minimizes an error for a set of data points comprising the number of outstanding input-output requests to the second storage unit and the average latency of input-output requests to the second storage unit over respective time intervals.

14. The method according to claim 9, wherein the measurement of the monitored performance of the first storage unit is determined based on a linear fit which minimizes an error for a set of data points comprising the number of outstanding input-output requests to the first storage unit and the average latency of input-output requests to the first storage unit over respective time intervals, and wherein the measurement of the monitored performance of the second storage unit is determined based on a linear fit which minimizes an error for a set of data points comprising the number of outstanding input-output requests to the second storage unit and the average latency of input-output requests to the second storage unit over respective time intervals.

* * * * *